United States Patent
Kanbara et al.

(10) Patent No.: US 11,555,093 B2
(45) Date of Patent: Jan. 17, 2023

(54) HALOGEN-CONTAINING POLYMER AND PRODUCTION METHOD FOR SAME

(71) Applicant: TOSOH CORPORATION, Yamaguchi (JP)

(72) Inventors: Takeshi Kanbara, Yamaguchi (JP); Tomohiro Arita, Yamaguchi (JP)

(73) Assignee: TOSOH CORPORATION, Yamaguchi (JP)

( * ) Notice: Subject to any disclaimer, the term of this patent is extended or adjusted under 35 U.S.C. 154(b) by 456 days.

(21) Appl. No.: 16/628,799

(22) PCT Filed: Jul. 9, 2018

(86) PCT No.: PCT/JP2018/025864
§ 371 (c)(1),
(2) Date: Jan. 6, 2020

(87) PCT Pub. No.: WO2019/009430
PCT Pub. Date: Jan. 10, 2019

(65) Prior Publication Data
US 2020/0199296 A1 Jun. 25, 2020

(30) Foreign Application Priority Data

Jul. 7, 2017 (JP) ............................. JP2017-133921
Nov. 15, 2017 (JP) ............................. JP2017-219687

(51) Int. Cl.
*C08G 65/42* (2006.01)

(52) U.S. Cl.
CPC .................................. *C08G 65/42* (2013.01)

(58) Field of Classification Search
CPC ............................ C08G 2650/46; C08G 59/30
See application file for complete search history.

(56) References Cited

U.S. PATENT DOCUMENTS

| 4,163,834 A * | 8/1979 | Wear | C08G 65/2639 428/383 |
|---|---|---|---|
| 2007/0252116 A1 | 11/2007 | Gelmont et al. | |
| 2010/0324219 A1 | 12/2010 | Liu et al. | |

FOREIGN PATENT DOCUMENTS

| GB | 1 578 359 | 11/1980 |
| JP | 48-49832 | 7/1973 |
| JP | 51-117737 | 10/1976 |
| JP | 52-93754 A | 8/1977 |
| JP | 53-56636 | 5/1978 |
| JP | 53-128656 | 11/1978 |
| JP | 55-50063 | 4/1980 |
| JP | 56-8809 | 2/1981 |
| JP | 59-24746 | 2/1984 |
| JP | 62-1973 | 1/1987 |
| JP | 8-225728 | 9/1996 |
| JP | 2012-524836 | 10/2012 |

OTHER PUBLICATIONS

International Search Report issued in International Patent Application No. PCT/JP2018/025864, dated Oct. 9, 2018.
Written Opinion issued in International Patent Application No. PCT/JP2018/025864, dated Oct. 9, 2019 and IPRP dated Jan. 7, 2020.

* cited by examiner

*Primary Examiner* — Christopher M Rodd
(74) *Attorney, Agent, or Firm* — Greenblum & Bernstein, P.L.C.

(57) ABSTRACT

To provide a highly heat resistant flame retardant.

A polymer having repeating units represented by the following formula (1), which has a weight average molecular weight as calculated as standard polystyrene of at least 6,000:

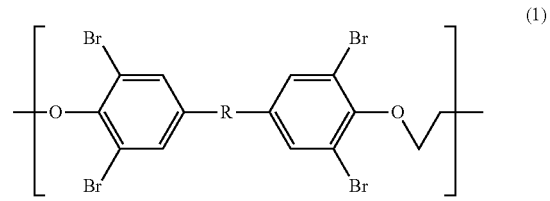

wherein R is a $C_{1-6}$ alkylene group, —S— or —$SO_2$—.

5 Claims, 1 Drawing Sheet

HALOGEN-CONTAINING POLYMER AND PRODUCTION METHOD FOR SAME

TECHNICAL FIELD

The present invention relates to a halogen-containing polymer to be used for flame retardants, etc., and a method for producing it.

BACKGROUND ART

Flame retardants are well known as an additive to impart flame retardancy to a resin when blended with the resin. Among such flame retardants, compounds containing bromine in a large amount have been added in various resins and used as a halogenated flame retardant. For example, tetrabromobisphenol A which is one of representative brominated flame retardants, is known as a halogenated flame retardant the most produced in the world.

As brominated flame retardants, higher molecular weight type flame retardants tend to be used considering environmental consciousness. For example, ethylene-bridged oligomers of tetrabromobisphenol A have been proposed (Patent Documents 1 to 4).

Such oligomers are defined to have a molecular weight of from 1,000 to 5,000 and a melting point of from 120 (or 150)° C. to 250° C., and are considered to be useful to impart flame retardancy to polystyrene or reinforced polyester.

PRIOR ART DOCUMENTS

Patent Documents

Patent Document 1: JP-A-S51-117737
Patent Document 2: JP-B-S56-8809
Patent Document 3: JP-A-S53-128656
Patent Document 4: JP-B-S62-1973

DISCLOSURE OF INVENTION

Technical Problem

The oligomers as reported in Patent Documents 1 to 4 do not have sufficiently high heat resistance, and a flame retardant material more excellent in heat resistance has been desired.

Under these circumstances, the object of the present invention is to provide a polymer of brominated bisphenol crosslinked by an aliphatic hydrocarbon group, excellent in heat resistance.

Solution to Problem

The present inventors have conducted extensive studies to achieve the above object and as a result, found that a halogen-containing polymer having a molecular weight higher than 6,000 can be obtained by a production method which has not been reported, comprising reacting a prepolymer compound having a crosslinking agent preliminarily added to both ends of a brominated bisphenol compound, and a salt of a brominated bisphenol compound. They have further found that the polymer obtained by such a method has high heat resistance and can significantly improve the weight loss temperature and the coloring starting temperature as compared with a known oligomer obtained by a conventional production method, and accomplished the present invention.

That is, the present invention provides the following halogen-containing polymer and method for producing it.

[1] A polymer having repeating units represented by the following formula (1), which has a weight average molecular weight as calculated as standard polystyrene of at least 6,000:

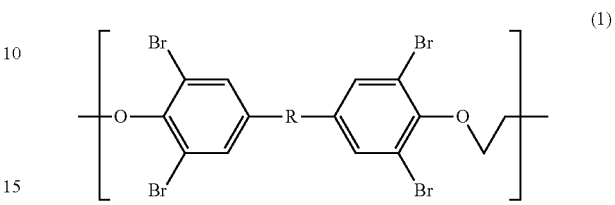

wherein R is a $C_{1-6}$ alkylene group, —S— or —SO$_2$—.

[2] The polymer according to [1], which has a weight average molecular weight as calculated as standard polystyrene of at least 7,500.

[3] The polymer according to [1] or [2], wherein the content of a monomer represented by the following formula (2) is at most 3% in the entire polymer having repeating units represented by the formula (1), as measured by GPC:

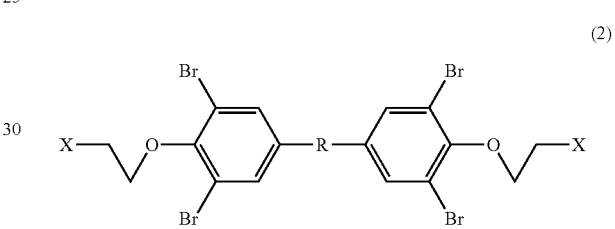

wherein R is a $C_{1-6}$ alkylene group, —S— or —SO$_2$—, and X is a halogen atom.

[4] The polymer according to any one of [1] to [3], which has a melting point of at least 255° C.

[5] The polymer according to any one of [1] to [3], wherein the 20 wt % weight loss temperature is at least 370° C. at a temperature-raising rate of 10° C./min.

[6] A method for producing the polymer as defined in any one of [1] to [5], which comprises reacting a compound represented by the following formula (2) and a compound represented by the following formula (3):

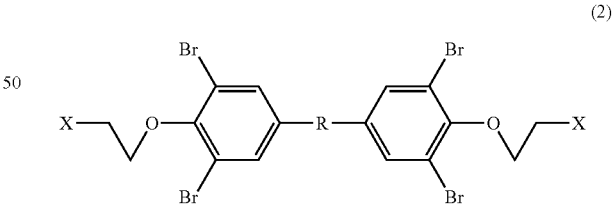

wherein R is a $C_{1-6}$ alkylene group, —S— or —SO$_2$—, and X is a halogen atom;

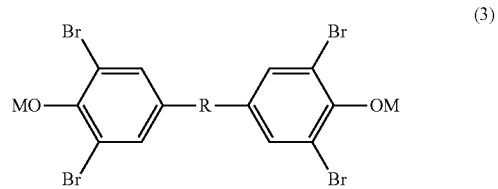

wherein R is a $C_{1-6}$ alkylene group, —S— or —SO$_2$—, and M is an alkali metal ion or a substituted or non-substituted ammonium ion.

Advantageous Effects of Invention

The polymer of the present invention has excellent effects as a flame retardant for a resin such as a plastic.

The polymer of the present invention has a higher molecular weight, has a higher melting point, has a higher weight loss temperature and is more excellent in heat resistance, than a conventional oligomer constituted by the same type of units.

The polymer of the present invention, which is excellent in heat resistance as compared with a conventional oligomer, can be kneaded and formed at higher temperature and has an effect to improve productivity of a flame retardant resin.

The polymer of the present invention has a remarkable and unexpected effect to improve flame retardancy of a highly heat resistant resin such as a polyamide, which can hardly be achieved by a conventional oligomer.

Further, the polymer of the present invention, which has a high coloring starting temperature, has an effect to improve outer appearance and beautifulness of a resin having the polymer of the present invention blended.

Accordingly, the polymer of the present invention is expected to have an effect to improve the quality, to improve the productivity, etc., in processing of a resin conducted at a temperature of from approximately 250° C. to approximately 300° C.

DESCRIPTION OF EMBODIMENTS

Now, the present invention will be described in further detail.

The compound of the present invention is a polymer having repeating units represented by the following formula (1) and has a weight average molecular weight as calculated as standard polystyrene of at least 6,000.

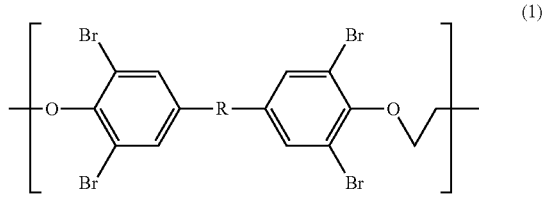

(1)

wherein R is a $C_{1-6}$ alkylene group, —S— or —SO$_2$—.

As an embodiment of the polymer of the present invention, a structure represented by the following formula (1a) may be mentioned.

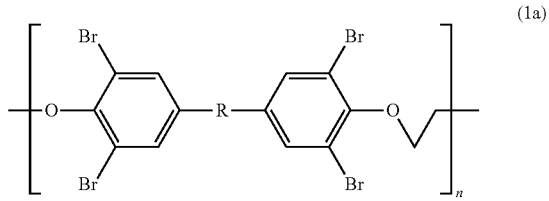

(1a)

wherein R is a $C_{1-6}$ alkylene group, —S— or —SO$_2$—, and n is a repetition number and is an integer of at least 1.

Due to the production method of the polymer of the present invention, its terminal groups are 2-haloethyl groups or phenolic hydroxy groups, and may be either of them. Such terminal groups are both reactive functional groups, and accordingly the terminal groups are preferably sealed with an unreactive or low reactive functional group. The sealing method is not particularly limited and may, for example, be a method of reacting a compound having only one substituent which is capable of reacting with the reactive functional groups, such as 4-bromophenol, 1,3,5-tribromophenol, pentabromophenol, benzyl chloride or a halogenated benzyl in which the aromatic nucleus is substituted by a halogen. The polymer having terminal groups sealed is included in the polymer of the present invention.

The $C_{1-6}$ alkylene group represented by R is not particularly limited and may, for example, be a methylene group, an ethylene group, a 2,2-propylene group, a 2,2-butyrene group, a hexadiene group or a 1,1-cyclohexylene group.

The polymer of the present invention has a weight average molecular weight of at least 6,000, and preferably at least 7,500, more preferably at least 8,000, in that such a polymer has a higher melting point, a higher coloring starting temperature and a higher weight loss temperature.

The polymer of the present invention has a higher weight average molecular weight than a conventional oligomer, and in view of excellent heat resistance, preferably has a low content of low molecular weight components. Particularly, the content of a monomer represented by the formula (2), as observed by GPC measurement, is preferably low, specifically, preferably at most 3%, more preferably at most 1%, in the entire polymer. The retention time of a peak in GPC derived from the monomer varies depending upon the GPC analysis conditions, but can be specified by a sample or a molecular weight as calculated as standard polystyrene.

The polymer of the present invention has a melting point of preferably at least 255° C., whereby its compatibility with a highly heat resistant resin will improve, although it is not particularly limited. Usually, a polymer tends to have a higher melting point as the molecular weight is higher, and the polymer of the present invention has a higher melting point than a conventional oligomer. The polymer of the present invention preferably has a high melting point, whereby kneading properties with a highly heat resistant resin will be favorable.

The polymer of the present invention has a high weight loss temperature as compared with a conventional oligomer. Specifically, with respect to the polymer of the present invention, the temperature at which 20% weight loss is reached, for example, at a temperature-raising rate of 10° C./min, is preferably higher than 365° C., more preferably higher than 370° C., whereby the polymer is excellent in heat resistance (hardly heat-decomposable).

Accordingly, the polymer of the present invention is expected to have an effect to improve the quality, to improve the productivity, etc., in processing of a resin conducted at a temperature of from approximately 250° C. to approximately 300° C.

The polymer of the present invention may be produced, for example, by reacting a compound represented by the following formula (2) and a compound represented by the following formula (3), although the process is not particularly limited.

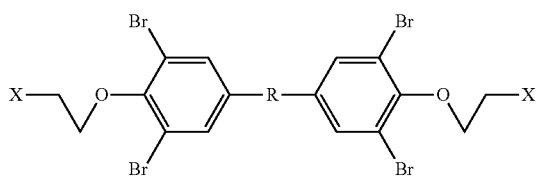

(2)

wherein R is a $C_{1-6}$ alkylene group, —S— or —SO$_2$, and X is a halogen atom;

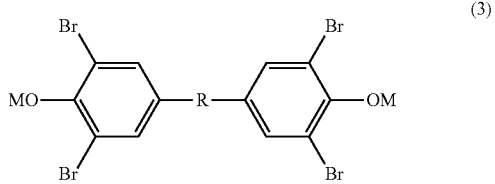

(3)

wherein R is a $C_{1-6}$ alkylene group, —S— or —SO$_2$—. M is an alkali metal ion or a substituted or non-substituted ammonium ion.

The definition and preferred range of the $C_{1-6}$ alkylene group in the formulae (2) and (3) are the same as the definition and preferred range of the $C_{1-6}$ alkylene group in the formula (1).

In the production method of the present invention, the compound represented by the formula (2) may be obtained by reacting a brominated bisphenol compound and a dihalogenated ethane in an excess amount in the presence of a base. Further, the compound represented by the formula (3) may be obtained by reacting a brominated bisphenol compound and a base.

The brominated bisphenol compound is not particularly limited and may, for example, be brominated bisphenol A or brominated bisphenol F.

The dihalogenated ethane is not particularly limited and may, for example, be 1,2-dichloroethane, 1-bromo-2-chloroethane or 1,2-dibromoethane.

The base is not particularly limited and may, for example, be lithium hydroxide, potassium hydroxide, sodium hydroxide, cesium hydroxide, lithium hydrogencarbonate, potassium hydrogencarbonate, sodium hydrogencarbonate, cesium hydrogencarbonate, lithium carbonate, potassium carbonate, sodium carbonate, cesium carbonate, calcium hydroxide, strontium hydroxide or barium hydroxide.

The halogen atom represented by X is not particularly limited and may, for example, be chlorine, bromine or iodine. Among them, chlorine is preferred in view of excellent industrial productivity.

The alkali metal ion represented by M is not particularly limited and may, for example, be a Li ion, a Na ion, a K ion or a Cs ion.

The substituted or non-substituted ammonium ion represented by M is not particularly limited and may, for example, be an ammonium ion, a methylammonium ion, a dimethylammonium ion, a trimethylammonium ion or a tetramethylammonium ion.

M is preferably a Na ion or a K ion, in view of excellent production efficiency and industrial productivity.

According to the production method of the present invention, which uses raw materials different from those in a conventional production method, and which can suppress volatilization and uneven distribution toward a vapor phase of a crosslinking agent at high temperature during the polymerization reaction, the monomer balance is hardly disturbed, and as compared with a conventional production method, a high molecular weight polymer can be stably produced.

In the production method of the present invention, a solvent is preferably used. The solvent is not particularly limited so long as it does not react with the raw materials, and may, for example, be an aprotic polar solvent.

The aprotic polar solvent is not particularly limited and may, for example, be tetrahydrofuran, dioxane, pyridine, N-methylpyrrolidone, propylene carbonate, dimethylacetamide, dimethylformamide or dimethylsulfoxide. Among them, preferred is N-methylpyrrolidone, dimethylacetamide, dimethylformamide or dimethylsulfoxide, whereby a high molecular weight polymer can be obtained.

In the production method of the present invention, the reaction temperature is not particularly limited and may, for example, be within a range of from 70° C. to 180° C.

In the production method of the present invention, a polymerization reaction is carried out preferably in a non-aqueous system, whereby a higher molecular weight polymer will be obtained. The method of conducting the polymerization reaction in a non-aqueous system is not particularly limited and may, for example, be a method of using a dehydrated solvent, a method of dehydrating the polymerization reaction system with a dehydrating agent, or a method of not using raw materials which may generate or emit water during the reaction. The dehydrating agent is not particularly limited and may, for example, be molecular sieves or zeolite.

The polymer of the present invention can impart flame retardancy to a resin when blended with the resin.

The resin is not particularly limited and may, for example, be polyethylene, polypropylene, polyvinyl chloride, polystyrene, polyvinyl acetate, poly(vinyl chloride/vinyl acetate), polyurethane, an acrylonitrile/butadiene/styrene resin, an acrylic resin, a phenolic resin, an epoxy resin, a melamine resin, a urea resin, a polyester resin, an alkyd resin, polyurethane, polyurea, polyimide, polyamide, polyacetal, polycarbonate, modified polyphenylene ether, polyethylene terephthalate, polybutylene terephthalate, cyclic polyolefin, polyphenylene sulfide, polytetrafluoroethylene, polysulfone, polyethersulfone, polyether ether ketone, polyimide or polyamideimide.

REFERENCE SYMBOLS

1: peak derived from monomer (compound represented by the formula (2))
2: peak derived from TBA material

EXAMPLES

Now, the present invention will be described in further detail with reference to Examples. However, it should be understood that the present invention is by no means restricted to such specific Examples.

Reference Example 1: Preparation of Tetrabromobisphenol A Bis(2-Chloroethyl) Ether Into a 2 L glass separable flask equipped with a stirrer, a condenser and a dropping funnel, 200 g (0.368 mol) of tetrabromobisphenol A, 399 g (4.70 mol) of dichloroethane, 6.3 g (18.5 mmol) of tetrabromoammonium hydrosulfate and 250 g of pure water were added in this order at room temperature, followed by heating to 60° C. with stirring in a nitrogen stream. A 23 wt % sodium hydroxide aqueous solution was dropwise added at the same temperature over a period of 20 minutes, followed by reaction at 90° C. for 24 hours. After completion of the reaction, the reaction liquid was left to cool to room temperature and poured into methanol. The precipitated solid was collected by filtration, washed and dried to obtain a white solid with a yield of 83%.

1H-NMR (ppm): 1.64 (s, 6H), 3.95 (m, 4H), 4.32 (m, 4H), 7.35 (s, 4H)

Reference Example 2: Preparation of Tetrabromobisphenol a Bissodium Salt

Into a 1 L glass eggplant flask, 100 g (0.184 mol) of tetrabromobisphenol A, 198 g of methanol and 14.7 g (0.368 mmol) of sodium hydroxide were added in this order at room temperature, followed by heating to 60° C. with stirring. After stirring at the same temperature for 1 hour, the solvent was distilled off, and the residue was further dried in vacuum to obtain a white solid with a quantitative yield.

Reference Example 3: Preparation of Tetrabromobisphenol a Bispotassium Salt

Into a 500 mL glass eggplant flask, 30 g (0.055 mol) of tetrabromobisphenol A, 59 g of methanol and 6.19 g (0.110 mol) of potassium hydroxide were added in this order at room temperature, followed by heating to 60° C. with stirring. Thereafter, the same operation as in Reference Example 2 was carried out to obtain a white solid with a quantitative yield.

Example 1: Preparation of Polymer

Figure 1:
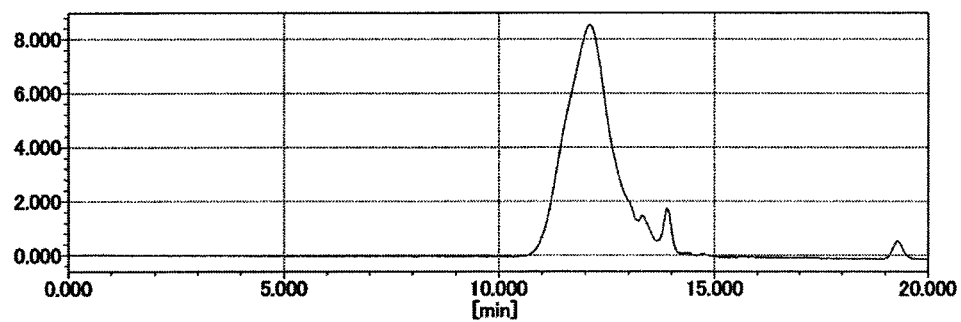
FIG. 1 is a GPC chart of a polymer prepared in Example 1.

Into a 500 mL glass eggplant flask, 7.14 g (12.2 mmol) of tetrabromobisphenol A bis(2-chloroethyl) ether obtained in Reference Example 1, 8.12 g (12.1 mmol) of tetrabromobisphenol A bissodium salt obtained in Reference Example 2 and 30 mL of dimethylformamide were added, followed by heating to 130° C. with stirring. After stirring at the same temperature for 17 hours, the reaction mixture was left to cool to room temperature. Water was added to the reaction mixture, and the precipitated solid was collected by filtration, washed and dried to obtain a white solid (polymer) having a molecular weight of 8,400 with a yield of 91%. The GPC chromatogram of the obtained polymer is shown in FIG. 1. It is found that low molecular weight components remarkably reduced as compared with Comparative Example 1. From the GPC chart, the monomer content in the polymer was 0%.

Comparative Example 1: Preparation of Oligomer (Conventional Method)

Figure 2:
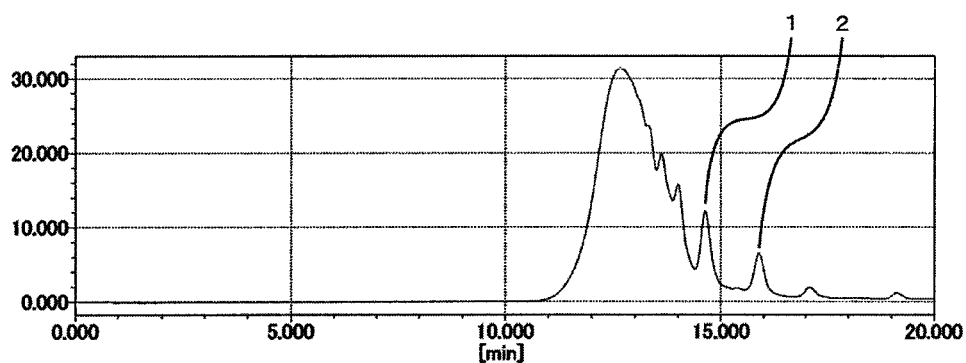
FIG. 2 is a GPC chart of a polymer prepared in Comparative Example 1.

In accordance with the method disclosed in Example 14 in Patent Document 2 (JP-B-S56-8809), an oligomer having a molecular weight of 3,500 was obtained with a yield of 78%. The GPC chromatogram of the obtained oligomer is shown in FIG. 2. The monomer content in the obtained oligomer was 11%.

Comparative Example 2: Preparation of Oligomer (Conventional Method)

In accordance with the method disclosed in Patent Document 2 (JP-B-S56-8809, Example 14) except that the reaction time was 17 hours, an oligomer having a molecular weight of 5,000 was obtained with a yield of 86%.

Comparative Example 3: Preparation of Oligomer (Conventional Method)

In the same manner as in Comparative Example 2 except that the reaction scale was 2.29 times (that is, the weight of tetrabromobisphenol A was 250 g, and the amounts of other materials used were also increased on the same scale), an oligomer having a molecular weight of 3,500 was obtained with a yield of 80%.

Example 2: Preparation of Polymer

In the same manner as in Example 1 except that into a 5 L glass eggplant flask, 540.5 g (0.808 mol) of tetrabromobisphenol A bis(2-chloroethyl) ether obtained in Reference Example 1, 475.0 g (0.808 mol) of tetrabromobisphenol A bissodium salt obtained in Reference Example 2 and 4 L of dimethylformamide were added, a polymer having a molecular weight of 8,300 was obtained with a yield of 94%. The monomer content in the polymer was less than 1%.

Example 3: Preparation of Polymer

In the same manner as in Example 1 except that 30 mL of N-methylpyrrolidone was used instead of 30 mL of dimethylformamide, a polymer having a molecular weight of 9,300 was obtained with a yield of 94%. The monomer content in the polymer was less than 1%.

Example 4: Preparation of Polymer

In the same manner as in Example 1 except that 30 mL of dimethylacetamide was used instead of 30 mL of dimethylformamide, a polymer having a molecular weight of 6,300 was obtained with a yield of 89%. The monomer content in the polymer was less than 1%.

Example 5: Preparation of Polymer

In the same manner as in Example 1 except that 7.53 g (12.1 mmol) of tetrabromobisphenol A bispotassium salt obtained in Reference Example 3 was used instead of 8.12 g (12.1 mmol) of tetrabromobisphenol A bissodium salt obtained in Reference Example 2, a polymer having a molecular weight of 9,200 was obtained with a yield of 94%. The monomer content in the polymer was less than 1%.

Example 6: Preparation of Polymer

In the same manner as in Example 1 except that 9.81 g (12.1 mmol) of tetrabromobisphenol A biscesium salt was reacted instead of 8.12 g (12.1 mmol) of tetrabromobisphenol A bissodium salt obtained in Reference Example 2, a polymer having a molecular weight of 6,300 was obtained with a yield of 90%. The monomer content in the polymer was less than 1%.

Example 7: Preparation of Polymer

Into a 100 mL glass eggplant flask, 6.60 g (12.1 mmol) of tetrabromobisphenol A, 30 mL of dimethylformamide and 0.971 g (24.2 mmol) of sodium hydroxide were added in this order at room temperature, followed by heating to 60° C. with stirring. After stirring at the same temperature for 1 hour, the reaction mixture was heated to 130° C. and stirred at the same temperature for 1 hour, water in the reaction solution was distilled off, and the reaction mixture was left to cool to room temperature, and 8.12 g (12.1 mmol) of tetrabromobisphenol A bis(2-chloroethyl) ether obtained in Reference Example 1 and 30 mL of dimethylformamide were added. The mixture was stirred at 130° C. for 17 hours and left to cool to room temperature. Water was added, and the precipitated solid was collected by filtration, washed and dried to obtain a white solid (polymer) having a molecular weight of 6,200 with a yield of 93%. The monomer content in the polymer was less than 1%.

Example 8: Preparation of Polymer

Into a 500 mL glass eggplant flask, 30.0 g (55.2 mmol) of tetrabromobisphenol A, 11.6 g (138 mmol) of sodium hydrogencarbonate, 55.0 g (556 mmol) of dichloroethane and 170 mL of dimethylformamide were added in this order at room temperature, followed by heating to 90° C. with stirring. After stirring at the same temperature for 3 hours, the reaction mixture was heated to 130° C., and unreacted dichloroethane was distilled off. Then, the reaction mixture was left to cool to room temperature, and 30.0 g (55.2 mmol) of tetrabromobisphenol A, 9.27 g (110 mmol) of sodium hydrogencarbonate and 170 mL of dimethylformamide were added. The reaction mixture was stirred at 130° C. for 17 hours and then left to cool to room temperature. Water was added, and the precipitated solid was collected by filtration, washed and dried to obtain a white solid (polymer) having a molecular weight of 10,000 with a yield of 96%. The monomer content in the polymer was less than 1%.

Measurement of Weight Loss Temperature

Using a TG-DTA measurement apparatus (manufactured by BrukerAXS, TG-DTA2020SA), TG analysis was conducted with respect to samples (polymer or oligomer) obtained in Examples 1 and 5 and Comparative Examples 1, 2 and 3. Measurement was carried out by raising the temperature at a rate of 10° C./min in the air using 10 mg of the sample. The results are shown in Table 1.

Measurement of Melting Point and Coloring Starting Temperature

Using a melting point measurement device (manufactured by AS ONE Corporation, ATM-01), the melting point of each of the polymer in Example 1 and the oligomer in Comparative Example 1 was measured. Further, the coloring starting temperature when the temperature raising was continued, was measured. The results are shown in Table 2.

TABLE 2

| Sample | Example 11 Example 1 | Comparative Example 7 Comparative Example 2 |
|---|---|---|
| Melting point | 267-275 | 230-242 |
| Coloring starting temperature ° C. | 280 | 230 |

Measurement of Flame Retardancy

Materials used for measurement of flame retardancy are shown below.

<Polyamide Resin (A)>

Polyamide 66: manufactured by TORAY INDUSTRIES INC., (trademark) AMILAN.

<Brominated Flame Retardant (B)>

The polymer of the present invention or brominated polystyrene was used.

Brominated polystyrene (hereinafter referred to as B-2): manufactured by Albemarle Corporation, (trademark) Saytex 7010.

<Inorganic Reinforcing Agent (C)>

Glass fibers: manufactured by Nitto Boseki Co., Ltd., chopped strands, (trademark) CSF3PE-455S.

<Antimony Flame Retardant Synergist (D)>

Antimony trioxide: manufactured by SUZUHIRO CHEMICAL CO., LTD., (trademark) AT3CN.

<Anti-Dripping Agent (E)>

Polytetrafluoroethylene: manufactured by Mitsubishi Chemical Corporation, (trademark) METABLEN.

The respective components as identified in Table 3 were charged in a twin screw extruder (ZSK-26, manufactured by Coperion), mixed at a temperature of from 230°C. to 325°C., discharged as strands and then pelletized. The obtained pellets of the polyamide resin composition were formed at a temperature of from 270 to 330° C. to obtain a standard test specimen (126 mm×12 mm×1.5 mm or 126 mm×12 mm×0.8 mm) for flame retardancy test.

Flame retardancy test UL94V was conducted to evaluate flame retardancy of each test specimen. Flame retardancy is

TABLE 1

| Sample | | Example 9 Example 1 | Example 10 Example 5 | Comparative Example 4 Comparative Example 1 | Comparative Example 5 Comparative Example 2 | Comparative Example 6 Comparative Example 3 |
|---|---|---|---|---|---|---|
| 3% weight loss temperature | ° C. | 365 | 369 | 344 | 351 | 342 |
| 10% weight loss temperature | ° C. | 376 | 374 | 356 | 361 | 354 |
| 20% weight loss temperature | ° C. | 381 | 378 | 362 | 365 | 360 |
| 30% weight loss temperature | ° C. | 385 | 380 | 363 | 366 | 364 | rated V-0, V-1 and V-2 in a descending order from higher flame retardancy. The results are shown in Table 3.

TABLE 3

| | Flame retardant (B) | Example 12 Example 2 | Comparative Example 8 B-2 |
|---|---|---|---|
| Parts | Polyamide resin (A) | 45.7 | 45.7 |
| | Flame retardant (B) | 18.0 | 18.0 |
| | Glass fibers (C) | 30.0 | 30.0 |
| | Antimony flame retardant synergist (D) | 6.0 | 6.0 |
| | Anti-dripping agent (E) | 0.3 | 0.3 |
| Flame retardancy UL 94V | Test specimen thickness: 1.5 mm | V-0 | V-0 |
| | Test specimen thickness: 0.8 mm | V-0 | V-0 |

It is found from Table 3 that the polymer of the present invention has flame retardancy equal to that of brominated polystyrene which has been widely used as a flame retardant for a polyamide resin.

Measurement of Mechanical Properties

The pellets prepared in each of Example 12 and Comparative Example 8 were formed to obtain a standard test specimen for mechanical property test. The mechanical property test was conducted by tensile test and bending test. The tensile test was carried out using a IA test specimen using a universal testing machine 5566 (manufactured by INSTRON) in accordance with ISO527-2. The bending test was carried out using a multipurpose A1 test specimen using a universal testing machine 5566 (manufactured by INSTRON) in accordance with ISO178. The results are shown in Table 4.

TABLE 4

| | Flame retardant (B) | Example 13 Example 2 | Comparative Example 9 B-2 |
|---|---|---|---|
| Mechanical properties | Tensile strength (MPa) | 165.7 | 157.4 |
| | Bending strength (MPa) | 250.7 | 244.7 |

Measurement of Heat Resistance (Melt Flow Rate)

The pellets (pellets after the first kneading) prepared in each of Example 12 and Comparative Example 8 was kneaded again by a twin screw extruder (ZSK-26, manufactured by Coperion) at a temperature of from 230 to 325° C. and pelletized again. The pellets were taken as pellets after the second kneading. Likewise, pellets after the third kneading subjected to kneading three times and pellets after the fourth kneading subjected to kneading four times were prepared.

With respect to the above-prepared pellets, the melt flow rate (hereinafter referred to as MFR) was measured using melt indexer (TP-401, manufactured by TESTER SANGYO CO., LTD.) in accordance with JIS K7210-1995 (two measurement conditions of temperature: 280° C., load: 1.20 kg and retention time: 6 minutes; and temperature: 300° C., load: 1.20 kg and retention time: 6 minutes).

The results are shown in Table 5.

The smaller the changes in the MFR values among four samples of the pellets after the first kneading, the second kneading, the third kneading and the fourth kneading, the smaller the deterioration of the resin composition by re-kneading, and the more excellent the heat resistance.

TABLE 5

| Flame retardant (B) | | Example 14 Example 2 | Comparative Example 10 B-2 |
|---|---|---|---|
| Heat resistance (MFR value) 280° C. × 1.2 kg | After first kneading | 17.5 | 15.7 |
| | After second kneading | 18.7 | 31.0 |
| | After third kneading | 21.4 | 37.3 |
| | After fourth kneading | 23.0 | 39.1 |
| Heat resistance (MFR value) 300° C. × 1.2 kg | After first kneading | 21.1 | 33.5 |
| | After second kneading | 30.5 | 71.7 |
| | After third kneading | 29.3 | 75.6 |
| | After fourth kneading | 22.4 | 100.6 |

It is found from Table 5 that the halogen-containing oligomer composition of the present invention has a stable MFR value even after kneading several times, and it is hardly deteriorated and is excellent in heat resistance as compared with a brominated polystyrene.

The present invention has been described in detail with reference to specific embodiments, but, it is obvious for the person skilled in the art that various changes and modifications are possible without departing from the intension and the scope of the present invention.

The entire disclosures of Japanese Patent Application No. 2017-133921 filed on Jul. 7, 2017 and Japanese Patent Application No. 2017-219687 filed on Nov. 15, 2017 including specifications, claims, drawings and summaries are incorporated herein by reference in their entireties.

The invention claimed is:

1. A method for producing a polymer having repeating units represented by the following formula (1)

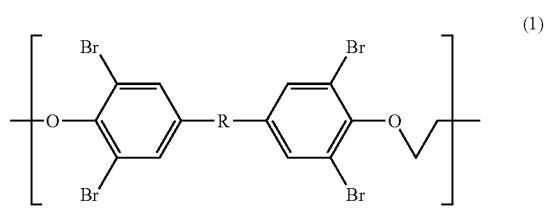

wherein R is a $C_{1-6}$ alkylene group, —S— or —SO$_2$—, which comprises reacting a compound represented by the following formula (2) and a compound represented by the following formula (3):

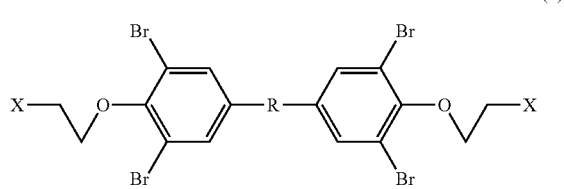

wherein R is a $C_{1-6}$ alkylene group, —S— or —SO$_2$—, and X is a halogen atom;

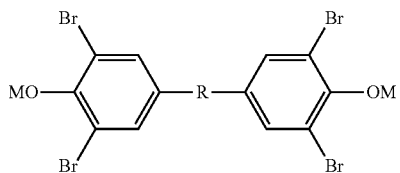
(3)

wherein R is a $C_{1-6}$ alkylene group, —S— or —SO$_2$—, and M is an alkali metal ion or a substituted or non-substituted ammonium ion;

wherein the polymer has a weight average molecular weight as calculated as standard polystyrene of at least 6,000.

2. The method of claim 1, wherein the polymer has a weight average molecular weight as calculated as standard polystyrene of at least 7,500.

3. The method of claim 1, wherein the content of a monomer represented by the following formula (2) is at most 3% in the entire polymer having repeating units represented by the formula (1), as measured by GPC:

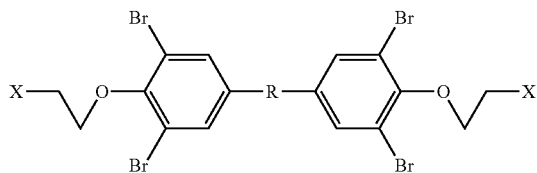
(2)

wherein R is a $C_{1-6}$ alkylene group, —S— or —SO$_2$—, and X is a halogen atom.

4. The method of claim 1, wherein the polymer has a melting point of at least 255° C.

5. The method of claim 1, wherein the 20 wt % weight loss temperature of the polymer is at least 365° C. at a temperature-raising rate of 10° C/min.

\* \* \* \* \*